United States Patent [19]

Smith

[11] 4,336,483
[45] Jun. 22, 1982

[54] CAPACITIVE POSITION SENSOR

[75] Inventor: Richard L. Smith, Concord, Mass.

[73] Assignee: Polaroid Corporation, Cambridge, Mass.

[21] Appl. No.: 114,998

[22] Filed: Jan. 24, 1980

[51] Int. Cl.³ .............................................. G05B 1/06
[52] U.S. Cl. .................................. 318/662; 361/280; 353/42
[58] Field of Search ................ 318/662; 361/280, 288; 353/27, 42

[56] References Cited

U.S. PATENT DOCUMENTS

| | | | |
|---|---|---|---|
| 1,569,003 | 1/1926 | Curtis | 361/280 X |
| 2,848,922 | 8/1958 | Field | 353/15 |
| 3,220,305 | 11/1965 | Van Gelder et al. | 353/15 |
| 3,472,585 | 10/1969 | Halberg et al. | 353/27 |
| 3,513,370 | 5/1970 | Pullen | 318/662 X |
| 3,683,402 | 8/1972 | Parnell | 346/32 |
| 3,760,254 | 9/1973 | Hardway, Jr. | 318/662 |
| 3,777,226 | 12/1973 | Luo | 361/280 X |
| 3,799,663 | 3/1974 | Barre | 353/27 |
| 3,802,614 | 4/1974 | Russell et al. | 226/9 |
| 3,804,503 | 4/1974 | Sissom | 353/15 |
| 3,807,846 | 4/1974 | Swank | 353/27 |
| 3,807,851 | 4/1974 | Knox | 353/120 |
| 3,844,649 | 10/1974 | Walter et al. | 353/120 |
| 3,885,867 | 5/1975 | Nelson et al. | 353/27 |
| 3,897,146 | 7/1975 | Smith | 353/26 |
| 3,924,122 | 12/1975 | Russell et al. | 250/236 |
| 3,928,796 | 12/1975 | Kahmer | 324/61 R |
| 4,060,318 | 11/1977 | Hansford | 353/42 |
| 4,146,314 | 3/1979 | Wilson | 353/42 |

FOREIGN PATENT DOCUMENTS 1435510  5/1976  United Kingdom .

Primary Examiner—B. Dobeck
Attorney, Agent, or Firm—Edward S. Roman

[57] ABSTRACT

Apparatus for positioning a projected image in response to input signals corresponding to the components of the commanded position of the image along a pair of orthogonal axes. The apparatus employs a pair of servo loops that position a projector mechanism along the respective axes. In each loop position feedback is provided by a capacitive transducer. A dielectric member is disposed between a pair of planar electrodes and moves back and forth in correspondence with movement of the projector mechanism. Consequently the area of the plates covered by the dielectric member, and thus the capacitance of the transducer, corresponds to the position of the mechanism. The capacitance of the transducer is converted to a dc signal by incorporating the capacitance in a conversion circuit that emits a series of pulses whose duty cycle is proportional to the capacitance.

3 Claims, 6 Drawing Figures

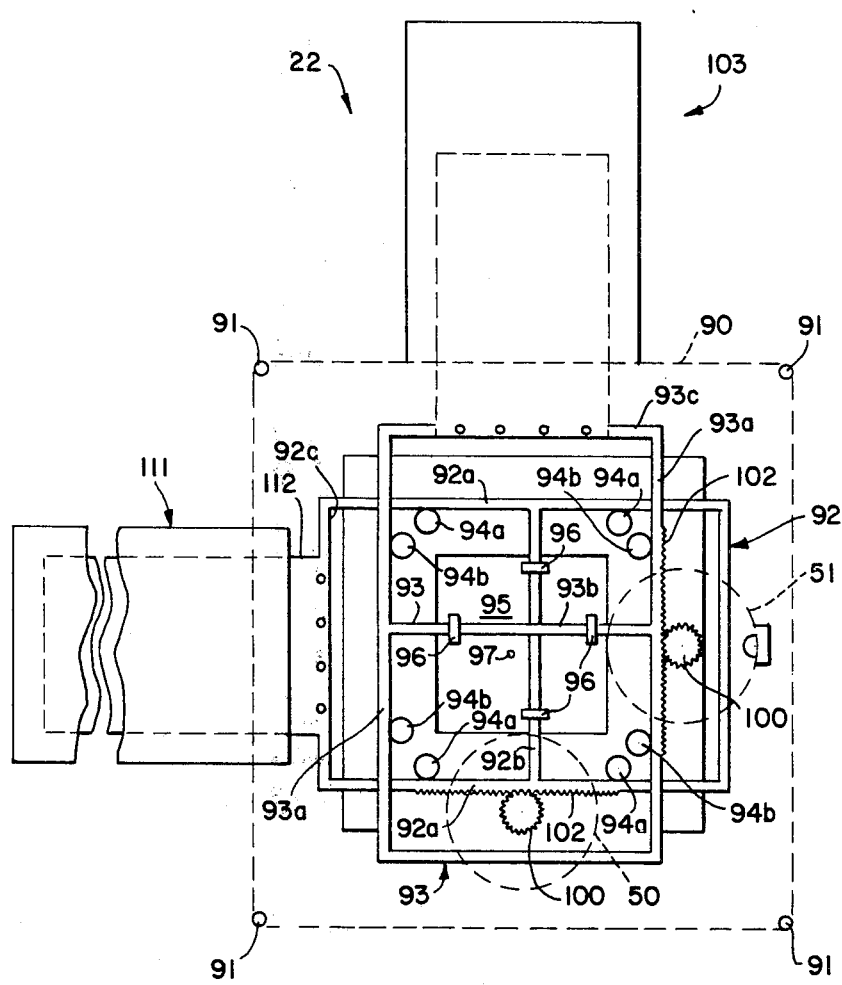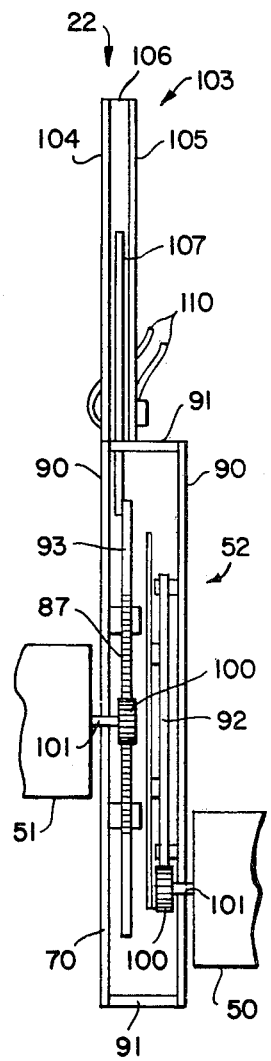
FIG. 4
FIG. 5

CAPACITIVE POSITION SENSOR

CROSS REFERENCE TO RELATED PATENT APPLICATION

U.S. Pat. No. 4,291,954 filed on even date with this application and titled Audio Visual System Having Improved Moving Light Pointer and assigned to the same assignee as the present invention.

BACKGROUND OF THE INVENTION

This invention relates to a positioner for controlling the location of a movable element, and, more specifically, to a positioner for controlling the location of a pointer image projected onto a viewing screen. Still more specifically, this invention relates to a positioner that moves a projected highlighting spot to commanded positions on a projection screen so as to highlight successively selected points in a pictorial image that is separately projected onto the screen. The positioner employs a servo loop that controls the pointer of a pointer image projector and thereby positions the pointer image as commanded. A pair of novel capacitive position sensors provide the requisite position feedback signals for the servo loop.

A variety of photographic image projection systems include pointers of one form or another that can be projected onto projection screens so as to point to or designate various parts of photographic images that are projected onto those screens. In this manner a lecturer, for example, can call an audience's attention to various aspects of a photographic image that he is discussing. One such system is described in U.S. Pat. No. 4,146,314 that is assigned to the assignee of this invention. That patent discloses several forms of automatic pointer apparatus for moving a highlighting spot over visual images in close coordination with an accompanying recorded audio program. The apparatus continually and rapidly generates a series of electrical signal sets. Each signal set corresponds to a two-dimensional position of the pointer image that is selected manually by an operator with a hand-held control device. The operator's movement of a control actuator, such as a joy stick, a stylus or even a finger, produces variations in the amplitudes of analog signals that form the signal sets.

Periodically the signal sets are sampled and converted into digital form and then recorded on a control track of a multiple track magnetic tape, along with control information that is also produced by the system. The recording of this information on the control track occurs simultaneously with the recording of the operator's spoken words, or some other audio program, on an audio track on the same tape. Concurrently the signals to be recorded on the tape are converted into suitable form for driving stepping motors to position a pointer mechanism that projects the pointer image onto the viewing screen. Thus, the pointer image follows the operator's movements of the control actuator.

During playback of the magnetic tape the recorded signals from the control track are converted into the form used for driving the stepping motors, so that the pointer image follows the signals recorded on the control track and thus retraces the path of the pointer image during the recording operation.

In the prior system there is a noticeable and disconcerting delay between the operator's movement of the control actuator and the positioning of the pointer image in response thereto. This lag forces the operator to concentrate on the pointer control function, and it therefore detracts from his concentration on the audio part of the program which he is simultaneously attempting to record. It can thus produce interruptions, pauses and repetitions in the audio program that degrade the overall effect of the program when it is played back.

Copending U.S. Pat. No. 4,291,954 discloses a system that effectively eliminates an undesirable lag between the operator's control movements and the movement of the pointer image in response thereto. In addition to that improvement, however, it is desirable to eliminate the discrete, jerky motions resulting from stepping motor movement of the pointer projector. The present invention is directed to the solution of this problem as well as to other improvements in the pointer movement mechanism.

SUMMARY OF THE INVENTION

Therefore it is an object of this invention to provide a pointer projector apparatus for moving a pointer image smoothly in response to commanded positions of the image.

Another object of the invention is to provide a pointer projector apparatus that is of relatively low cost.

Still another object of the invention is to provide a pointer projector apparatus that provides a faithful response to commands for positioning the pointer image.

A pointer projector embodying the invention employs a pair of dc position servo loops that position a projector mechanism along orthogonal axes in response to input signals specifying the commanded position of the pointer image. Specifically one servo loop responds to an x signal corresponding to the x component of the desired position and the other loop responds to a y signal corresponding to the y position component. Each servo loop includes a dc servo motor that provides movement along the corresponding axis.

Each servo loop also includes a novel capacitive position sensor that senses the position of the projector mechanism along the corresponding axis. The sensor comprises a pair of planar opposed electrodes with a moveable dielectric plate disposed between the electrodes. The dielectric plate is mechanically coupled to the projector mechanism so as to move longitudinally therewith in such manner that the electrode area covered by the plate varies according to the position of the projector mechanism. The capacitance between the electrodes thus also varies according to that position. The sensor is very simple in construction, yet it provides a linear output, which is highly desirable in servo applications. Also it is insensitive to tolerance variations; and, in particular, it is insensitive to the transverse position of the dielectric plate. In fact the plate can even brush against one of the electrodes without significantly affecting the position signal developed by the sensor.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIG. 4 is a view in front elevation of a preferred embodiment of a pointer mechanism for use with this invention;

FIG. 5 is a side elevation of the pointer mechanism shown in FIG. 4;

DESCRIPTION OF AN ILLUSTRATIVE EMBODIMENT

A. Overall System

Figure 1:
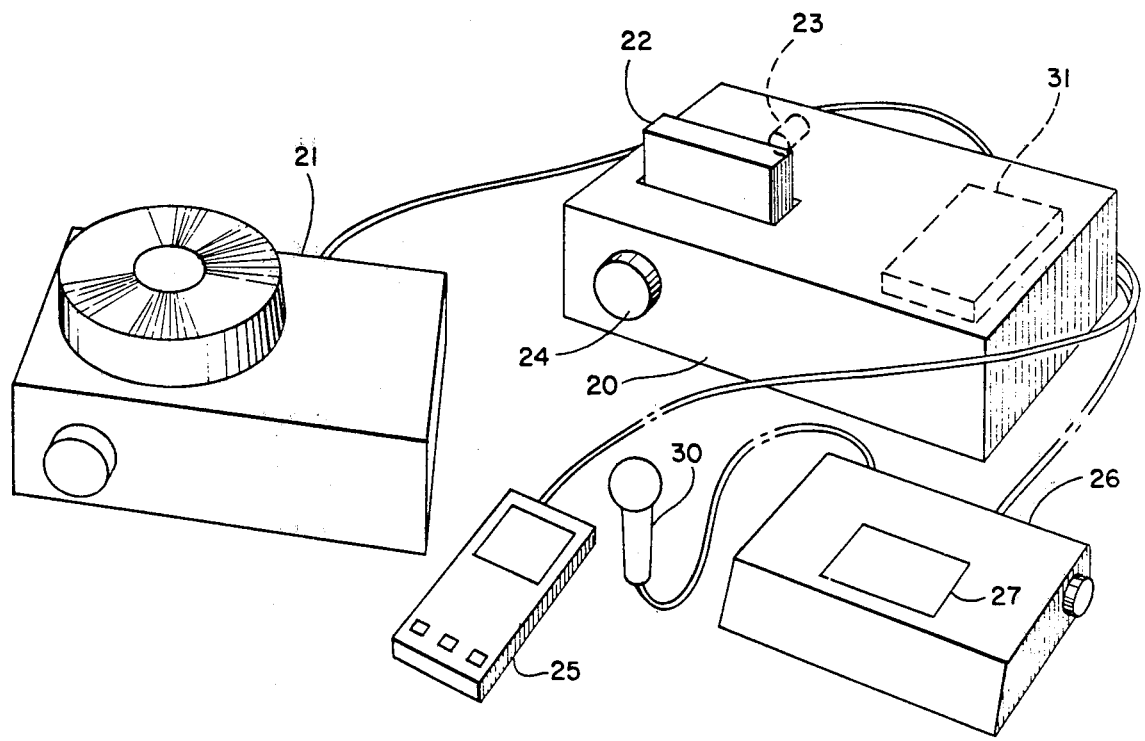
FIG. 1 is a simplified perspective view of an automatic pointer apparatus that is contained in a projection mechanism that is separate from a standard front screen slide projector and a recording-playback mechanism.

FIG. 1 depicts the application of this invention to an automatic, programmable pointer apparatus 20 that is separate from a conventional slide projector 21 that includes a connection to the apparatus 20. The apparatus 20 includes a pointer mechanism 22 that is illuminated by a projection lamp 23. A lens 24 projects the resulting highlighting spot onto the projection screen (not shown) when the projector 21 and apparatus 20 are aligned properly. A manual control device 25 provides input signals to the apparatus 20 for manually controlling slide changes in the projector 21 and for generating signals that control the position of the highlighting spot. A conventional two-track cassette recorder 26 connects to the apparatus 20 and includes a cassette port 27. As previously indicated, one track receives the audio input from a microphone 30. The other track receives the signals produced when the operator moves the highlighting spot and changes slides. A control circuit 31 in the apparatus 20 controls the transfer of signals between the various elements shown in FIG. 1.

B. Control Device 25

Figure 2:
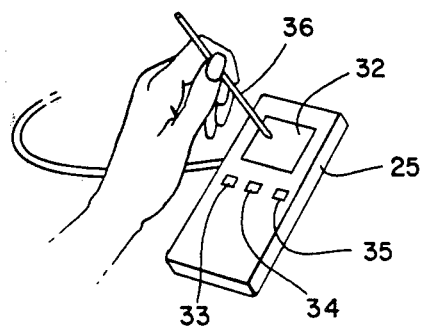
FIG. 2 is a perspective view of a hand-held device for the manual positioning of a highlighting spot generated by any of the apparatus shown in FIGS. 1 through 3.

Referring to FIG. 2, the control device 25 is adapted to operate in conjunction with various electrical circuits to generate positioning control signals in an analog form that will enable a mechanism, such as the positioning mechanism 22 in FIG. 1, to position the highlighting spot in accordance with this invention. In this specific embodiment, the control device 25 includes a generally rectangular position transducer or pad 32 and three switches immediately below the pad 32. Switch 33 is actuated to produce a forward slide change. Pressure on switch 34 produces a reverse slide change. Pressure on switch 35 causes the spot positioning apparatus to move the highlighting spot to a reference or "home" position.

Such a pad can be hand-held. Although it is possible for an operator to actuate the pad 32 with finger pressure, FIG. 2 depicts a hand-held stylus 36 that may be pressed against the pad 32. In such an embodiment, the control device 32 includes a backing that would keep the device fixed on a flat surface.

Such transducer pads 32 as shown in FIG. 2 are well known devices. They are multilayer, position-transducing devices, whose electrical resistances, measured along vertical and horizontal directions, vary in response to the mean position of the mechanical force compressing the layers. More specifically, a voltage is applied alternately across each dimension of the pad, e.g., vertically and horizontally. The pad acts as a potentiometer, with the stylus or thumb pressure being equivalent to a sliding contact on the potentiometer. The physical position of the pressure point on the pad, therefore, determines a resistance ratio of the pad in each of the horizontal and vertical directions. A voltage is switched alternately across the horizontal and vertical resistances in the pad to produce, with other circuitry, respective X and Y output analog pulse trains. The pulse amplitudes in each pulse train are determined by the corresponding resistance ratios and therefore correspond with the pressure position in the respective horizontal and vertical directions.

C. Control Circuit

Figure 3:
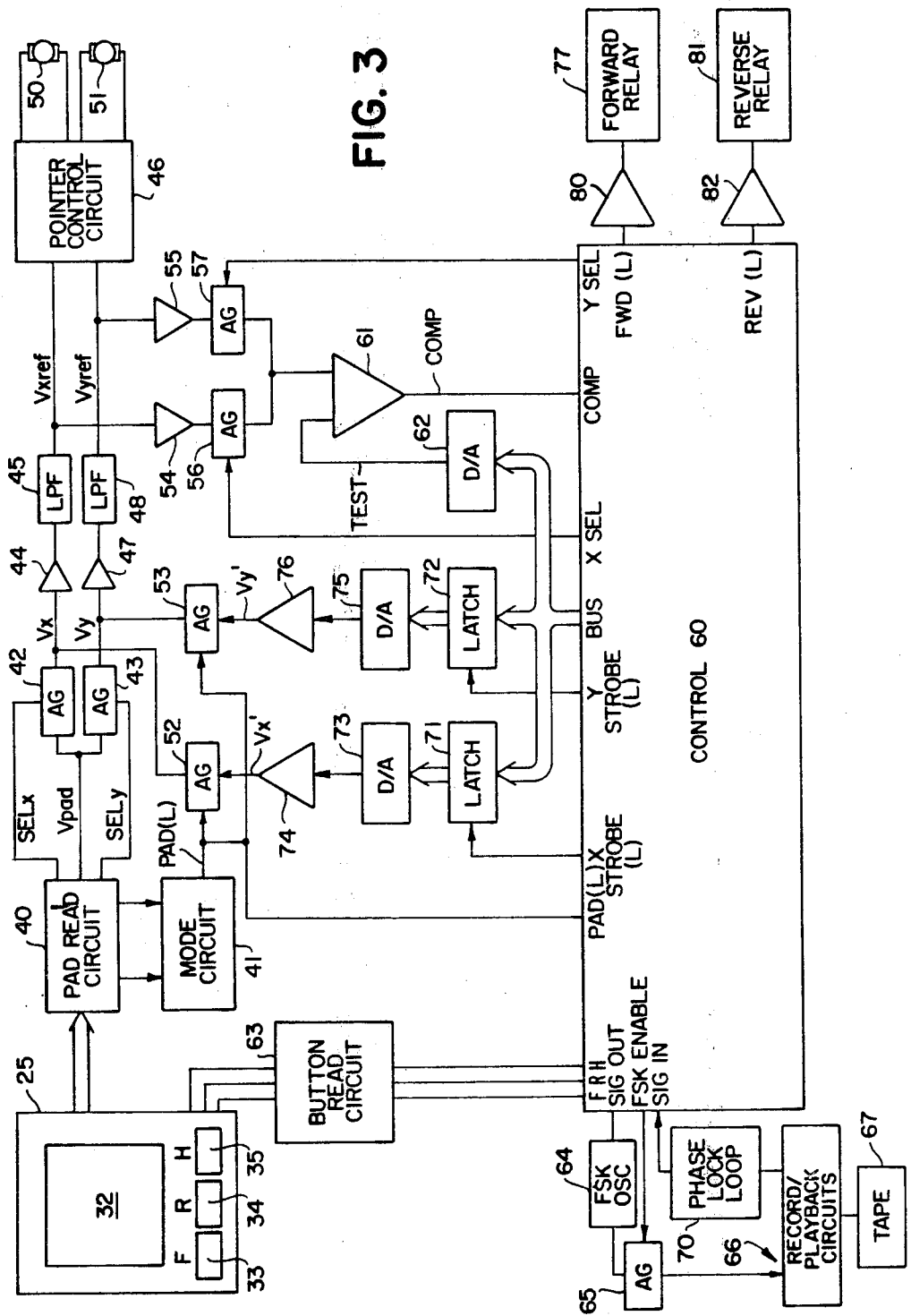
FIG. 3 is a functional block diagram of control circuitry for an automatic pointer apparatus according to this invention.

When an operator activates the pad 32, control circuitry, shown in FIG. 3, develops signals that control the pointer mechanism 22 that is shown generally in FIG. 1 and in more detail in FIGS. 4 and 5. FIG. 3 depicts a control device 25 of the type shown in FIG. 2. The signals from the pad 32 are coupled to a pad read circuit 40 that responds to the input signals by generating SEL X, SEL Y, and V PAD signals in analog form. Thus, the pad 32 and pad read circuit 40 constitute portions of a position control means that generates first positioning control signals in a first, or analog, form.

A mode circuit 41 is an element in a mode selection means that also includes analog gates 42 and 43 that connect to the pad read circuit 40. The circuitry asserts a PAD signal any time the operator applies pressure to the pad 32. In this specific embodiment the signal is designated as a PAD (L) signal; the "(L)" indicates that the signal is at a low, normally ground, potential when the PAD signal is at an asserted, or logical TRUE or "1" state. Analog gates 42 and 43 couple V pad signals as Vx and Vy signals, respectively, to a pointer control circuit 46 in response to SELx and SELy signals. An amplifier 44 and a low pass filter 45 couple the Vx signals to the pointer control circuit 46 as a Vxref signal; an amplifier 47 and low pass filter 48 couple the Vy signals to the pointer control circuit 46 as Vyref signals.

Thus, when an operator applies pressure to the pad 32 the Vx and Vy positioning control signals are coupled directly to the pointer control circuit 46 as reference signals for controlling DC servomotors 50 and 51 respectively. When the PAD signal is not asserted, analog gates 52 and 53, also in the mode selection means, couple Vx' and Vy' signals, respectively, to the pointer control circuit 46 as second positioning control signals so as to maintain reference inputs for the circuit 46. The source of these second positioning control signals is described later.

Other circuitry in FIG. 3 converts signals (i.e., the Vxref and Vyref signals) corresponding to first positioning control signals from the pad read circuit 40 into a frequency modulated form that is adapted to be recorded on the control track of a magnetic tape in a cassette that is placed in the recorder 26. More specifically, amplifiers 54 and 55 couple signals in analog form from the outputs of the filters 45 and 48 respectively to analog gates 56 and 57 that are controlled by X SEL and Y SEL signals, respectively, from a control 60. A comparator 61 alternately compares the Vxref and Vyref signals with analog feedback signals from a digital-to-analog (D/A) converter 62 as part of a first conversion process during which each set of sampled analog signals is converted into X and Y position control bytes in digital form. The control 60 also converts signals from a button read circuit 63 into a header control byte in digital form. These three control bytes are then combined into a 3-byte word that is transferred serially, by bit, into a frequency-shift-keyed oscillator 64 that converts each control word into a sequence, or burst, of frequency shift keyed signals that are particularly well adapted for being recorded on magnetic tape. An analog gate 65, that the control 60 enables, couples the burst of frequency shift keyed signals to a recording input of record/playback circuits 66 in a conventional tape recorder to be recorded on a tape 67 when the circuits 66 are in their recording mode. Obviously, if the circuits 66 are not in their recording mode, the signals will not be recorded on the tape 67.

Thus, when the operator uses the pad 32, the signals from the pad read circuit 40 are coupled directly, without conversion, to the pointer control circuit 46 as position reference signals that are used by servomechanisms to control the motors 50 and 51 and thereby position the highlighting spot. If the operator has the circuits 66 in a recording mode, bursts of signals corresponding to the analog signals, in a frequency-shift-keyed form, are recorded with other control information, on one track, as a control track of the magnetic tape, concurrently with any audio information that is being recorded on another track as a program track.

Conversion circuitry for converting the recorded signals from the tape back to analog positioning signals includes a phase lock loop 70. It produces, in serial form, a sequence of digital signals that corresponds to the recorded frequency-shift-keyed information. These signals are fed to the control 60 for decoding and control of the appropriate responses.

When the control 60 decodes each control word from the control track, it forms the header and X and Y position control bytes in digital form and routes these signals to appropriate outputs. For example, the X and Y position control bytes move through an output port to latches 71 and 72 in response to X STROBE (L) and Y STROBE (L) signals, respectively. The latch 71 receives successive X position control bytes which are converted into an analog form by a D/A converter 73. An amplifier 74 couples an amplified analog signal to the analog gate 52 as a Vx' signal that corresponds to the digital value transferred into the latch 71 and thus also to the recorded Vxref signal. A digital-to-analog (D/A) converter 75 and amplifier 76 convert the successive Y position control bytes into a Vy' analog signal corresponding to the recorded Vyref signal and apply this signal to the analog gate 53.

Whenever the PAD signal is not asserted, the analog gate 52 couples the Vx' signal to the amplifier 44 and low pass filter 45. Similarly the analog gate 53 couples the Vy' to the amplifier 47 and the low pass filter 48. Thus, the digital-to-analog converters 73 and 75, and the amplifiers 74 and 76 are components of a second conversion means that provides position control signals that control the position of the highlighting spot.

The second conversion means can also produce the position control signals during recording. At various times during recording, the operator may move the spot to a particular location and then remove his finger or stylus from the pad 32. This is known as a "park" mode, during which the highlighting spot should not move. As described in more detail later, the digital bytes in the latches 71 and 72 always correspond to the last position of pressure. Thus, when the operator removes pressure from the pad 32, the analog gates 52 and 53 couple to the pointer control circuit 46 a series of Vx' and Vy' signals corresponding to the last pressure position. These signals supplant the Vx and Vy signals that are derived from the pad read circuit 40. Thus, the highlighting spot does not move until the operator again uses the pad 32 or, as will now be described, changes a slide or presses the button 35 to produce a homing operation.

Still referring to FIG. 3, the button read circuit 63 produces an "F" signal when the operator presses the button 33 on the control device 25. This corresponds to a command for producing a forward slide change and the control 60, in response, energizes a forward relay circuit 77 through an amplifier 80, thereby to change the slide by using conventional means to advance the slide mechanism such as is shown in the slide projector 21 in FIG. 1. Similarly, if the operator pushes the button 34, the button read circuit 63 produces an "R" signal. The control 60 energizes a reverse relay circuit 81 through an amplifier 82 to produce a reverse slide change. When the operator activates the button 35, the button read circuit 63 produces an "H" signal. The control 60 responds to the "H" signal and also to the slide change commands by causing the highlighting spot to move to a "home", or reference, position. Whenever any one of these buttons is pressed, the control 60 produces a corresponding header control byte for recording on the control track with X and Y position bytes that identify the home position.

D. Pointer Control Mechanism

Still referring to FIG. 3, the pointer control circuit 46 includes servomechanism control circuits that control servomotors 50 and 51 to move the pointer mechanism 22 of FIG. 1. One pointer mechanism that can be used with the motors 50 and 51 is shown in FIGS. 4 and 5. The illustrated pointer mechanism 22 has a generally square configuration defined by a pair of spaced, parallel, plates 90, 90, formed of an optically transparent material such as plexiglass. Four posts 91 secure and space the plates 90, 90. A pair of rectangular frames 92 and 93 are mounted between the plates on sets of idler rollers 94a and 94b rotatably secured to the plates 90, 90. Two rollers 94a engage the inner edge of each longitudinal frame member 92a thereby supporting the frame 92 for movement horizontally in FIG. 4. Similarly, two rollers 94b engage the inner edge of each lengthwise frame member 93a to support the frame 93 for movement in the vertical direction in FIG. 4. The horizontal or "X" frame 92, therefore, moves horizontally and the vertical or "Y" frame 93 moves vertically.

Each frame 92, 93 has a transverse cross member 92b and 93b, respectively, that supports a thin, opaque mask 95 by engaging the mask under a set of slide loops 96 projecting from the mask 95. The two loops on a given cross member move the mask with the associated frame, while the other two loops slide along the cross member on the other frame. Simultaneous movement of both frames moves the mask along an arbitrary path. The mask 95 contains a central aperture 97, that defines the pointer image when illuminated by a light source (e.g., the light source 23 in FIG. 1). The aperture 97 is shown as a circular hole which produces a circular highlighting spot on the viewing screen. Thus movement of the frames 92 and 93 provides corresponding movement of the mask 95 and the spot of light projected through the aperture 97 onto the screen.

The servomotors 50 and 51 drive the two frames 92 and 93 respectively. Each motor drives its corresponding frame through a pinion 100 mounted on a motor drive shaft 101 rotatably mounted in a plate 90. Each pinion 100 meshes with a toothed rack 102 formed on an associated frame member 92a, 93a. Rotation of a motor shaft 101 is thus transformed into longitudinal translation of the associated frame.

The foregoing basic mechanical structure was disclosed in U.S. Letters Pat. No. 4,146,314, but was driven by stepping motors. This met the requirements for low mass and low moving friction that assure that a pointer mechanism responds quickly and reliably to changes in desired pointer position. These requirements also can be met with a circuit that utilizes the DC servomotors 50 and 51. As apparent, however, such a servomotor must include a position sensor for generating a frame position signal in order to complete a servo loop that controls the servomotor.

A simple, reliable and inexpensive position transducer that is constructed in accordance with this invention is shown in FIGS. 4 and 5. For the vertically moving frame 93, this transducer is designated by reference numeral 103. It contains two spaced conductor plates 104 and 105 that mount to the top frame 91. A cross member 106 at the top supports the outer ends of the plates 104 and 105 in a spaced, parallel relationship.

A preferably rectangular dielectric plate 107 is affixed to a cross-member 93c across the top of the frame 93 and moves vertically with the frame 93, between the plates 104 and 105. The dielectric plate 107 can comprise any insulating material. An insulating substrate used to construct printed circuit boards and cut to the proper dimension has been found to provide excellent results. Conductors 110 connect the plates 104 and 105 to a "Y" servo control circuit (FIG. 6) that controls the vertical movement of the frame 93.

Plates 104 and 105 and the dielectric plate 107 constitute a variable capacitor in which the capacitance represents the position of the frame 93. Signals on the conductors 110 thus constitute vertical frame position signals that are inputs to the servo control circuit for positioning the frame 93. This structure is relatively insensitive to transverse mispositioning of the dielectric plate 107. In fact, it has been found that the plate 107 can actually touch one or the other of the plates 104 and 105 without affecting the positioning accuracy of the servo control circuit.

It should be noted that with a rectangular shape for the dielectric plate 107 and movement of the plate along a longitudinal axis thereof, i.e. parallel to a side of the rectangle, the capacitance of the transducer is linearly related to the vertical position of the frame 93.

A similar position transducer 111 is associated with the horizontally moving frame 92. Specifically, a dielectric plate 112 is affixed to the left frame member 92c.

E. Pointer Control Circuit

The pointer control circuit 46 of FIG. 3 includes two separate servo control circuits. One controls the servomotor 50; the other, the servomotor 51. Both servo control circuits are identical, so the following discussion is limited to the servo control circuit that controls the X servomotor 51 in response to the Vyref signal.

Figure 6:
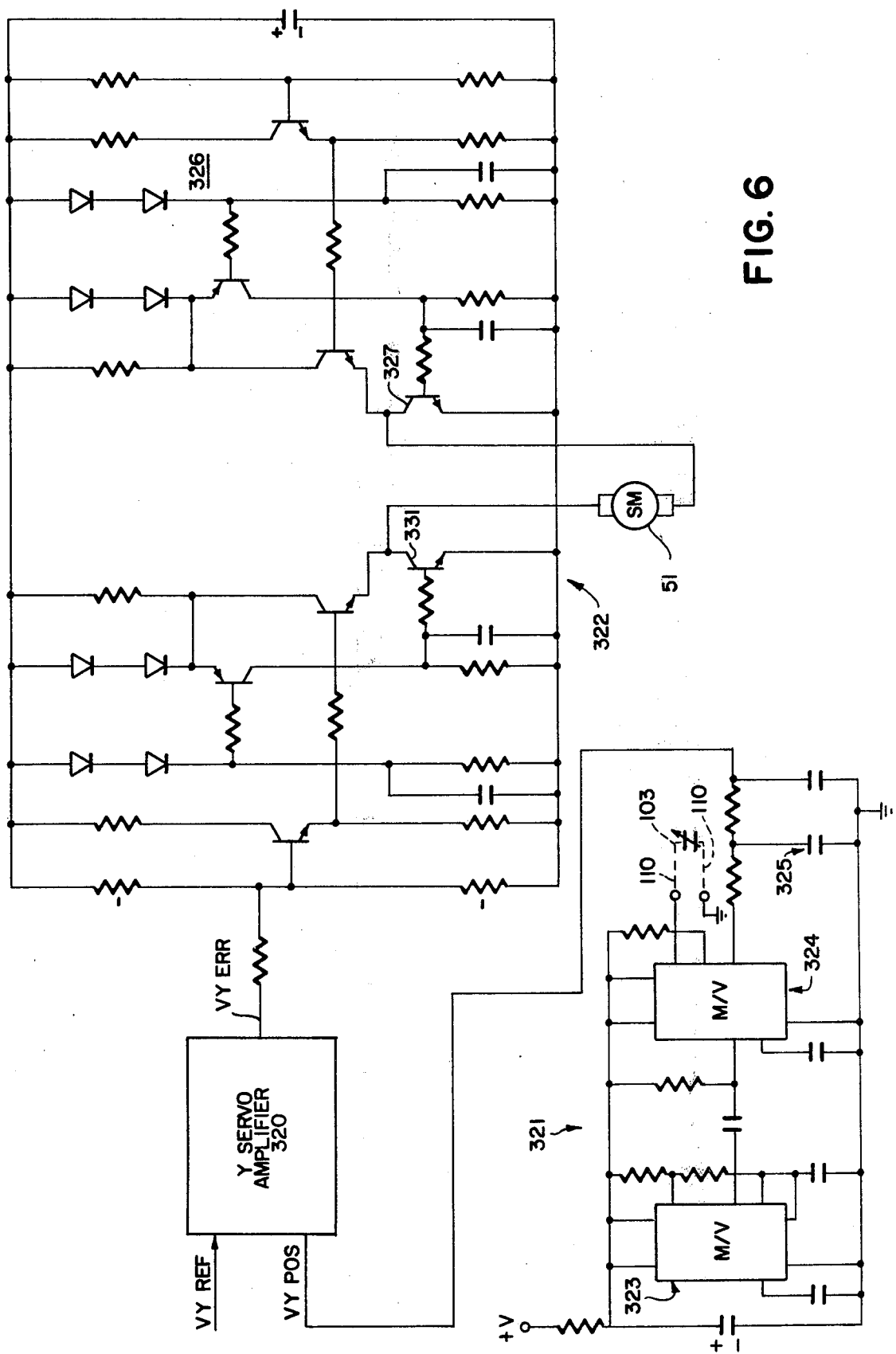
FIG. 6 is a detailed block diagram of a pointer control circuit that is shown in FIG. 3.

Referring to FIG. 6, the Vyref signal is applied to one input of a conventional servo amplifier 320 which compares it with a Vypos positioning signal from a position sensing circuit 321. A resulting error signal, Vyerr, controls a motor drive circuit 322 that energizes the servo motor 51 (also shown in FIGS. 3 through 5).

The position sensing circuit 321 utilizes the capacitive transducer 103 shown in FIGS. 4 and 5 to produce the Vypos signal. Specifically, a first timer, in the form of a multivibrator 323, operates as a fixed frequency oscillator. Each time its output undergoes a positive going transition, it triggers a second timer, in the form of a monostable multivibrator 324. However, the "on-time" for this timer is controlled by the sensor 103. Thus the multivibrator 324 produces a train of pulses that have a fixed frequency determined by the fixed oscillator and a duty cycle proportional to the capacitance of the sensor 103. A low pass filter 325 converts the pulse train into a dc Vypos signal, whose level is linearly related to the "y" position of the highlighting spot.

The motor drive circuit 322 comprises a differential amplifier. The right portion 326 establishes a reference voltage at an output transistor 327. The left portion 330 establishes a signal at its output transistor 331 that reflects the Vyerr signal. The error signal can cause the voltage from the transistor 331 to be greater or less than that from the transistor 327. Thus the motor 51 is energized by a bipolar, variable amplitude voltage to position the highlighting spot in the vertical direction in accordance with the Vyref signal.

E. Summary of the Description

There has been disclosed pointer projection system that automatically positions a pointer image on a viewing screen in response to dc signals corresponding to commanded positions. The system employs a servo loop in which dc servo motors move the projector mechanism in response to drive signals resulting from a comparison of the commanded position of the image with the actual position thereof. The actual position is sensed by a novel position sensor employing a capacitive position transducer and a conversion circuit that converts the output of the sensor to a dc signal. The transducer is simple and inexpensive, yet it is rugged and provides an accurate indication of the position of the projector mechanism. The conversion circuit is a simple and inexpensive circuit employing conventional digital components to provide a direct dc indication of the capacitance of the sensor.

The disclosed apparatus that provides these features is but one embodiment of the invention. It will be apparent to those of ordinary skill in the art that numerous other embodiments can be utilized to implement the invention. For example there are other arrangements that can be used instead of the double-frame arrangement depicted in FIGS. 4 and 5 to provide for simultaneously movement of the projected beam along to axes. Also a different conversion circuit can be used to provide dc signals corresponding to the capacitance of the position transducer. However the disclosed embodiment of the invention is the preferred one. Therefore it is the object of the appended claims to cover all such variations and modifications as come with the true spirit and scope of this invention.

What is claimed is:

1. Apparatus for positioning a projected image in response to a dc input signal corresponding to a commanded position, said apparatus comprising:
   a movable projector mechanism whose position determines the position of the projected image;
   a motor connected to drive said projector mechanism;
   means for providing a position feedback signal comprising a capacitive position transducer for developing a capacitance corresponding to the position of said projector mechanism and means for deriving a DC position signal corresponding to said capacitance, said transducer comprising a pair of plate-like electrodes fixedly spaced apart in opposed relation with respect to each other and a generally rectangularly shaped dielectric member defining a pair of orthogonal axes, said dielectric member being mechanically coupled to said projector mechanism so that movement of said projector mechanism causes movement of said dielectric member in a direction parallel to one of its said axes along a parallel plane between said electrodes so as to vary the proportion of said dielectric member between said electrodes and thereby vary the capacitance of said transducer linearly in correspondence with the position of said projector mechanism; and means for converting the position signal with the input signal to provide a drive signal for the DC motor.

2. The apparatus defined in claim 1 in which said conversion means comprises:
an oscillator; and
a monostable multivibrator triggered by said oscillator, said position transducer operating as a timing component so that the duration of the unstable state of said multivibrator corresponds to the capacitance of said transducer.

3. Positioning apparatus for positioning a device in response to an input signal corresponding to a commanded position, said apparatus comprising:
a motor connected to drive said device;
a position sensor transducer for developing a position signal corresponding to the position of said device, said transducer comprising a pair of plate-like oppositely and fixedly spaced apart electrodes, a plate-like dielectric member having a rectangular shape defining a pair of orthogonal axes and disposed for movement between said electrodes, and mechanical coupling means for moving said dielectric member in response to movement of said device so as to move said dielectric member along one of its said axes to vary the proportion of said dielectric member disposed between said electrodes and thereby vary the capacitance of said transducer in linear correspondence with the position of said device;
conversion means for deriving a dc signal corresponding to the capacitance of said transducer; and
means for combining the output of said position sensor transducer with the input signal to provide a drive signal for said motor.

* * * * *